United States Patent Office 2,858,225
Patented Oct. 28, 1958

2,858,225
NOVEL AND IMPROVED PACKAGING PROCESS

Chester M. Gooding, Staten Island, N. Y., and Daniel Melnick, Teaneck, and Hans W. Vahlteich, Englewood, N. J., assignors to The Best Foods, Inc., New York, N. Y., a corporation of New Jersey No Drawing. Application June 16, 1954
Serial No. 437,294

16 Claims. (Cl. 99—171)

The present invention relates to a novel and improved method for packaging products, which normally foster the growth of microbiological contaminants or microorganisms, and fungi in particular, to prevent or retard the growth of such organisms. More specifically, the invention relates to a method of wrapping and treating wrapped articles, particularly foods, which foster mold growth and which have an irregular external surface or configuration, to render the wrapped articles more resistant to the growth of molds on their outer surfaces. The terms "microorganisms" and "microbiological contaminants" are employed in this application in their generic sense and are intended to include a number of bacterial species, yeast, as well as fungi. The present invention finds its most effective application in the inhibition of the growth of fungi, which includes mildews, rusts, smuts and molds, etc., and yeasts, particularly molds and yeasts. For the sake of convenience, the inhibitory function of the invention will be described primarily with respect to fungi and, more specifically, molds.

Many foods and non-food products are susceptible to mold spoilage. Mold growth occurs on the surface of such products and requires a medium (the article in question) to support such mold growth, the presence of air, and a moist environment. The articles to which the process of the present invention is of primary importance are of such composition that a fungistatic agent may not be incorporated directly into the product, due to this causing an undesirable change in the structural composition of the article. Other articles which may be protected by the process of this invention may have a fungistatic agent incorporated within the product, but this is an uneconomical process since all of the fungistatic material other than that at the surface of the product is wasted, mold propagation being almost exclusively a surface growth occurrence.

Furthermore, many of the articles or products protected by the process of this invention do not lend themselves to being coated with an aqueous solution of the fungistatic agent, since the residual water on the surface would counteract the effectiveness of the fungistatic agent as a result of increasing the humidity within the package. It is not possible to apply the fungistatic agents encompassed by this invention in such an aqueous solution with subsequent processing of the article prior to packaging to evaporate such water, since in so doing the fungistatic agents would then be largely volatilized. Packaging such products in wrappers in the usual manner, which wrappers have been treated with an edible mold inhibiting or fungistatic preparation, has not solved the problem either, since this treatment does not prevent or inhibit mold propagation on the surface of the product at the unavoidable air pockets which occur between wrapper and product. For illustrative purposes, the packaging of a number of foods is briefly discussed to show more clearly the scope of articles which may be protected by the present invention.

*Natural cheese.*—The incorporation of fungistatic agents, pertinent to this invention, into the interior of such foods prior to packaging for retail sales would effect an undesirable change in the texture of such foods. The application of the fungistatic agents in aqueous solution to the surface of these products would result in a higher humidity in the package and thereby contribute to greater susceptibility to mold spoilage. Such products, particularly Swiss cheese with eyes, cannot be wrapped without having air pockets at the periphery of the package or within the package itself.

*Fruits and vegetables.*—The same considerations listed above with respect to natural cheese apply in the packaging of such products as strawberries, oranges, lemons, high-moisture prunes, high-moisture dates, tomatoes, and others.

*Meat products.*—Packaging such products as sliced bologna, sliced ham, sliced bacon, frankfurters, sausages, sliced liverwurst, and luncheon meats in moisture-vapor-proof wrappers cannot protect these products against mold spoilage. The fungistatic agent may be incorporated into some, but this, as mentioned above, is an uneconomical use of the fungistatic material. There has been a great desire to package raw meats in moisture-vapor-proof wrappers for direct consumer sale, but such packaging today cannot be carried out in a central packaging plant due to mold spoilage in addition to other factors responsible for deterioration. In some such products, viz., raw steaks and chops, the fungistatic agent cannot be uniformly incorporated. When such products are packed in the usual manner in a wrapper coated with a fungistatic agent, they are not adequately protected since unavoidable air pockets occur between wrapper and product.

*Yeast-raised baked products.*—In the making of yeast-raised products, the baker cannot tolerate an interference with the process of yeast fermentation. Practically all fungistatic agents are effective in inhibiting the growth of yeasts as well as molds. Among the bacterial species (catalase positive) inhibited is *Bacillus mesentericus*, responsible for "rope" formation in yeast-raised baked products. These generalizations apply to the fungistatic materials encompassed by this invention. Because of the effect on yeasts the concentrations of fungistatic agents added to yeast-raised products are severely limited with a corresponding decrease in fungistatic effectiveness. The baker must strike a compromise in weighing undesirable extension of fermentation time versus desirable mold protection. Furthermore, in many yeast-raised products (those not sliced) the fungistatic material within the product is wasted.

Yeast-raised products which are particularly susceptible to mold spoilage are those of very high moisture content, viz., more than 40%. These include such products as English muffins, and more particularly the so-called "Brown 'N Serve" products in moisture-vapor-proof packages. The former requires extended toasting to make it palatable. The latter type of product is incipiently baked and requires completion of the baking in the home prior to consumption. Air pockets between wrapper and such products are unavoidable during packaging. The manufacturers of these high-moisture-containing baked products have been plagued with mold problems making the shelf life of these products relatively short, a matter of several days, whereas with mold protection they could remain on the grocer's shelf for a number of weeks before becoming unsalable. Various attempts have been made to overcome the propensity for mold growth on the surface of these products by resorting to storage under refrigeration, including storage in the frozen state, but such storage conditions unduly increase the cost of marketing such products. As far as we are at present advised, no adequate solution to the problem has been presented and today "Brown 'N Serve" products, while popular with the houswife, have not achieved the popularity which they might have if the mold problem could be overcome.

*Chemically-leavened baked products.*—In the case of biscuits, doughnuts and cakes, such as layer cakes, fruit cakes, and others made with baking powder, fungistatic agents may be incorporated into the batter prior to baking but that which is not at the surface is wasted in so far as protection of the products against mold spoilage is concerned. Air pockets between such products and wrapper are regularly noted.

*Pasteurized cheese products.*—Whereas the fungistatic agents may be incorporated into pasteurized cheese products, it is economically wasteful to do so. Furthermore, the problem of air pockets in the moisture-vapor-proof packaging of such cheese products reduces the effectiveness of ordinary wrapping with wrappers treated with a fungistatic agent.

Cheese products in glass jars or in tubs have unavoidably large air pockets between cheese surface and cap. The edible fungistatic agents encompassed by the present invention cannot bridge such air pockets to protect the surface of the cheese.

It is an object of the present invention to provide a method for inhibiting the growth of molds on articles, and particularly foods, after packaging or wrapping, said articles being capable of fostering mold growth on the surface due to an air pocket between article and fungistatic wrapper because of an irregular external surface or configuration of the article.

Another object of the present invention is to provide a method for inhibiting the growth of molds on natural cheese, pasteurized cheese products, meat products, yeast-raised baked products, chemically-leavened baked products, etc., after packaging or wrapping the product due to inability to exclude air pockets between the surface of the product and a fungistatic wrapper.

Another object of the present invention is to provide a method for inhibiting the growth of molds on fruits and vegetables due to inability to exclude air between the surface of the fruits and vegetables and a wrapper treated with a fungistatic agent.

Further objects of the present invention are to provide wrapped food articles of the type mentioned above which have excellent resistance to mold spoilage.

Further objects will be apparent to those skilled in the art upon reading the specification which follows:

The present invention comprises a novel process for inhibiting the growth of microorganisms, and particularly molds, in and on products normally fostering such growth. The process contemplates wrapping said product with a wrapping material which has been treated on the inner surface with a fungistatic agent which is only slightly volatile, or of relatively low volatility at room temperatures but which volatilizes readily at elevated temperatures, and subjecting the fungistatic agent in said wrapping material to that degree of brief heating which will cause substantial volatilization of the fungistatic agent within the wrapped confines and to deposit it upon the cool surfaces of the wrapped articles. In this operation, it is important to observe certain limits which will be discussed hereinbelow in order that no damage will be done to the wrapping material and no chemical or physical changes will occur in the food products as a result of the flash heat treatment.

The present invention calls for a wrapper (or a cap in packaging the product in rigid containers) which is coated on its inner surface with a fungistatic agent which is substantially non-volatile at normal room temperature or at temperatures of storage of the wrapped product. The fungistatic agent is capable of rapidly subliming or volatilizing at elevated temperatures of upwards of 200° F. The preferred fungistatic agents encompassed by this invention remained stable and in the gaseous state at environmental temperatures of up to 600° F. during the period of flash heating.

Among the fungicidal agents contemplated for use in the present invention are organic carboxylic acids having an unsaturated carbon to carbon linkage adjacent to the carboxyl group in accordance with the following formula:

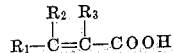

That portion of the molecule containing the carbon to carbon unsaturation (alpha-beta unsaturation) may be either an aliphatic or aromatic hydrocarbon group. Where more than one unsaturated carbon to carbon linkage exists in the molecule, such unsaturation should be part of a conjugated double bond system with the alpha-beta carbon to carbon unsaturation. In the formula given above, $R_1$ is hydrogen when $R_2$ and $R_3$ combine to complete a single carbocyclic nucleus; $R_1$ is a carbon atom of an aliphatic hydrocarbon group when $R_2$ and $R_3$ are hydrogen atoms. Examples of such acids are crotonic, isocrotonic, dimethylacrylic, alpha-hexenoic, benzoic, sorbic and parahydroxybenzoic acids. The preferred acids according to this embodiment of the invention are benzoic, parahydroxybenzoic, sorbic and alpha-hexenoic acids. Benzoic and sorbic acids are the most suitable.

The preferred fungicidal agents for employment in the present invention are the unsaturated aliphatic mono-carboxylic acids falling within the hereinabove described structural formula and which are described in United States Letters Patent No. 2,379,294, issued on June 26, 1945. These acids are entirely aliphatic in character and possess at least one double bond in the alpha position in relation to the carboxyl group. These acids have the following general formula:

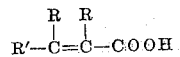

In this formula R represents a hydrogen atom or an alkyl group, R' represents an aliphatic hydrocarbon radical. Among the acids contemplated in accordance with this formula are sorbic acid, alpha-hexenoic acid (also known as isohydrosorbic acid), crotonic acid (trans-form) isocrotonic acid (cis-form), beta-ethylacrylic acid and dimethylacrylic acid. Crotonic acid may have an objectionable taste and color and where the fungistatic acid is to be used in quantities sufficient to impart taste properties to the treated product, it is preferred to employ one of the other acids, such as sorbic acid, which in addition to being highly effective as a mold-growth inhibiting agent, is also quite tasteless and odorless. Because of its superior qualities, sorbic acid is the preferred mold-growth inhibiting agent for use in the present invention.

The aliphatic and aromatic carboxylic acids herein defined are characterized by substantial volatility at temperatures upwards of 200° F. While these acids do not boil at this temperature, they do nevertheless sublime, volatilize, or vaporize sufficiently and are capable of diffusing from the wrapper to the surface of the wrapped foods during the period of flash heating.

Any fungistatic agent which is of comparatively low volatility at room temperature and which becomes volatile either through sublimation or evaporation at the elevated temperatures contemplated by the process may be used, although it is preferred that it be of an edible and non-toxic nature. The sorbic, alpha-hexenoic and benzoic acids described hereinabove are not toxic and do not have unpleasant odors. The fungistatic agents, as the dry carboxylic free-acid, may be dusted upon the wrapping material provided the latter has a moisture-free tacky base which will permit retention of these crystals. Suitable materials for this tacky base include waxes, such as the micro-crystalline waxes, with or without the customary additives.

It has been discovered that the micro-crystalline wax coatings with or without additives, such as polyethylene, rubber compositions, etc., interfere somewhat with the volatilization of the fungistatic agent during the flash heating of the wrapped food products. The preferred method of applying the fungistatic agents to the inner surface of the wrapping material involves suspending the fungistatic materials in an alcoholic solution of a binder material such as shellac, ethylcellulose, zein, and related products, applying the suspension as a thin coating to the inner surface of the wrapper, and volatilizing the alcohol at as low a temperature as possible. The binder material is present in the alcohol solution in a concentration of less than 25% and preferably less than 10%. The resulting sheet is coated on one surface with a uniform compact layer of the fungistatic acid, with each crystal firmly bound so that the fungistatic agent does not rub off when the wrapping material is employed as an individual sheet or as a roll feed. The quantity of the fungistatic agent on the wrapper need not exceed 15 grams per thousand square inches and preferably is not in excess of 5 grams per thousand square inches of wrapper surface. The quantity of fungistatic agent should exceed 0.5 gram, and preferably exceed 1 gram, per thousand square inches of wrapper surface. From such wrapping materials, there occurs substantial volatilization of the fungistatic agents during the period of flash heating.

Wax may also be employed as a binder in applying the fungistatic agent to the wrapper, rather than as a foundation base as described hereinabove. Under such circumstances, the fungistatic agent is suspended in the molten wax in a concentration of from about 25% to 35% by weight and the suspension applied to the wrapper. From this suspension applied to the wrapper the fungistatic agent can be rendered volatile only after heat treatment of the wrapped foods in accordance with the present invention. By employing the wax as a binder rather than as a foundation base, more effective heat sublimation of the fungistatic agent results.

The wrapping materials of this invention are desirably capable of withstanding environmental temperatures up to 600° F. during the period of flash heating. For this purpose, films of cellophane, cellulose acetate and glassine paper have proved to be satisfactory whereas films made of low melting material such as polyethylene and Pliofilm have proved to be less satisfactory.

The process of the present invention may be used to inhibit the growth of molds on the surface of the food products previously described. In general, the process is preferably employed to treat articles having an irregular external surface or configuration, such that wrapping material containing the fungistatic agent cannot conveniently be placed into intimate surface contact with the wrapped food.

The advantages of the present invention are particularly applicable in treating natural cheeses, luncheon meats, and partially baked yeast-raised goods. The sublimed fungistatic agents diffuse onto and then into the surface of the luncheon meats and natural cheeses so that they escape visual detection. In the case of the partially baked products such as the "Brown 'N Serve" baked goods, the crystals escape visual detection because of the white background of the food product. In all cases a high surface concentration of fungistatic agent is attained at locales where mold spoilage is most likely to occur. During the baking of the "Brown 'N Serve" products in the home, the fungistatic agents are completely volatilized from the surface, but this is of no concern since, from this time on, need of fungistatic protection is no longer required.

In the case of fruits and vegetables, crystals of the fungistatic agents may be seen on opening the package much like a very fine crystalline sugar deposit. This is of no concern since such products are washed prior to use in the home. Also, a fungistatic agent may be employed which has no undesirable taste or other unwanted properties. Accordingly, the process of the present invention provides an efficient and practical means of obtaining a more durable and mold resistant packaged food product.

Temperatures of upwards of 200° F. are employed for volatilizing the fungistatic agents from the wrappers to the surface of the enclosed food products. As the temperature of heating of the wrapped food products is increased, the period of heating may be reduced. For reasons of efficiency in manufacturing operations, it is preferable to use a temperature of not less than 300° F. and not greater than 550° F. When heating the wrapped foods at a temperature of about 300° F., a period of about 3 minutes is desirable to obtain substantial volatilization of the fungistatic agents from the wrappers. Even in this case, there might be objections to such a process from the standpoint of manufacturing efficiency because the heating period could constitute a "bottle neck" in maintaining adequate production rates in the packaging of food products. Heating for a shorter period of about 30 seconds at temperatures of about 300° F. is not recommended since a low degree of volatilization of the fungistatic agents is obtained. It is preferable to use temperatures in the region of 450°–550° F. and to subject the wrapped foods to these temperatures for a short period of 5 to 30 seconds for effective volatilization of the fungistatic agents. The use of this higher temperature range permits a flash heating operation which permits high production rates and has the further advantage that less abuse of the food products themselves occur. Thus, during the heating of heat labile food products such as cheese and raw meat, extended heatings of 3 minutes or so at the lower temperatures result in some visually detectable damage to the food products, i. e., excessive oiling off of the cheese and surface discoloration of the raw meats. Furthermore, the surfaces of the food products are no longer cool condensing surfaces to capture the volatilized fungistatic materials so that during the period the heated wrapped foods regain room temperature, greater opportunities exist for return of the sublimed fungistatic agents to the surface of the wrappers. On the other hand, heating at 450°–550° F. of the wrapped food products constitutes, as was discovered in the course of the research investigation which led to the present invention, a flash heating effective in volatilizing substantial portions of the fungistatic agents from the inner surface of the wrappers without heating to elevated temperatures the foods contained therein. The latter then supply cool condensing surfaces for the volatilized fungistatic agents so that reverse sublimation to the wrappers does not occur.

For illustrative purposes, data are presented in Table I, shown below, demonstrating the degree of volatilization of fungistatic agents from the wrappers of this invention upon being subjected to heat treatments. For these studies, a sheet of wrapper coated on the inner surface was laid across the top rim of a Payne Permeability Cup, on top of the sheet was laid another steel ring and the wrapper sheet clamped into position. This left an area of 1.61 sq. inches of the wrapper with the surface treated with fungistatic agent facing the cup cavity. Assemblies such as these were placed in ovens at specified temperatures and left there for various periods of time. They were then removed and allowed to come to room temperature. The sheets were then carefully removed and in each case the area over the cup cavity was analyzed for residual fungistatic material. The sublimed fungistatic material found in the cup cavity was dissolved in alcohol and also analyzed. In addition, the sheets were analyzed for fungistatic material prior to the heat treatment.

TABLE I

*Illustrative findings on the volatilization of fungistatic agents from wrapper during heating*

| Description of Wrapper | | | Exposure | | Amount of Fungistatic Acid, Gm. per 1,000 sq. in. | | | |
|---|---|---|---|---|---|---|---|---|
| Base Sheet | Binder [1] | Fungistatic Acid | Temperature, °F. | Time, Sec. | Unheated Wrapper | Sublimed | Retained by Wrapper | Total Recovered |
| Cellophane | Shellac (6%) | Sorbic | 350<br>350<br>450<br>550<br>550 | 30<br>120<br>30<br>7<br>30 | 2.2–2.5 | 0.28<br>1.52<br>1.37<br>1.45<br>1.65 | 2.07<br>0.95<br>0.78<br>0.90<br>0.37 | 2.35<br>2.47<br>2.15<br>2.35<br>[2] 2.02 |
| Cellulose Acetate | Zein (12%) | do | 350<br>450<br>550<br>550 | 30<br>30<br>7<br>30 | 4.0–4.5 | 0.48<br>1.64<br>1.42<br>1.77 | 3.90<br>2.33<br>2.48<br>0.79 | 4.38<br>3.97<br>3.90<br>[2] 2.56 |
| Glassine | Shellac (9%) | Benzoic | 350<br>350<br>450<br>550<br>550 | 30<br>120<br>30<br>7<br>30 | 6.0–6.5 | 0.62<br>2.80<br>3.24<br>3.15<br>4.10 | 5.90<br>3.43<br>3.11<br>3.00<br>0.72 | 6.52<br>6.23<br>6.35<br>6.15<br>[2] 4.82 |
| Cellophane | Microcrystalline wax (1,200%) | Sorbic | 350<br>450<br>550<br>550 | 30<br>30<br>7<br>30 | 3.0–3.8 | 0.55<br>0.83<br>0.39<br>1.62 | 2.95<br>2.39<br>2.65<br>1.68 | 3.50<br>3.22<br>3.04<br>3.30 |
| Do | Microcrystalline wax (1,400%) | Benzoic | 350<br>450<br>550<br>550 | 30<br>30<br>7<br>30 | 3.3–4.4 | 0.14<br>0.69<br>0.27<br>1.55 | 3.66<br>2.60<br>4.16<br>2.66 | 3.80<br>3.29<br>4.43<br>4.21 |

[1] Expressed in terms of percent by weight of the fungistatic agent.
[2] Loss due to some volatilization of fungistatic acid through the wrapper.

We have concluded that more effective volatilization of the fungistatic acids is obtained when the ratio of binder to fungistatic acid is low, less than 25:100. The waxes used in very high ratio melt during the heat treatment, solubilize much of the fungistatic acids and thereby interfere with volatilization of these fungistatic materials. The use of the alcohol soluble binders for anchoring the fungistatic acids to the sheet is preferred. Based upon the data in Table I and the results of practical tests conducted upon wrapped food products, the preferred methods for treating foods wrapped in the fungistatic wrappers, described in this specification, are exposure of the wrapped foods to a temperature of 450° F. for about 30 seconds or to 550° F. for about 7 seconds. After exposure for longer periods at the higher temperature, 500°–600° F., more fungistatic acid is volatilized from the wrapper, but some loss of fungistatic material through the wrapper is noted. Furthermore, some foods within the wrapper exhibit undesirable physical changes as a result of the prolonged heating, viz., excessive "oiling off" in the case of cheese and discoloration of raw meat products.

Th flash heat treatment of the wrapped food products is preferably carried out by passing the items on a moving belt through a hot air tunnel maintained at 450°–550° F. Infrared or other suitable heating elements may be employed for the flash heating of the wrappers to volatilize the fungistatic acid from hot wrapper to the cool contents. The wrapped products are allowed to cool before shipment, some products to room temperature (the baked products for example), while others are first chilled in the refrigerator (cheese and raw meat products for example). In general, the wrapped products are brought to those temperatures characteristic of the products at the time of retail sale.

A feature of the present invention is that the appearance of the wrapper in some cases serves as a food indicator of sufficient heating in volatilizing the fungistatic acid. Thus, when using cellophane or cellulose acetate wrappers treated with a fungistatic acid, these change in appearance from a translucent white to a crystal clear film as a result of volatilizing the layer of fungistatic acid crystals from the wrappers. The wrappers with a wax base also exhibit transparency when hot but become cloudy on cooling due to the resetting of the non-volatile wax base. Changes in transparency are not visually detectable when fungistatic glassine wrappers are employed.

In order more clearly to disclose the nature of the present invention, specific examples illustrating the practice of the invention will hereinafter be described. It should be understood, however, that this is done solely by way of example and is intended neither to delineate the scope of the invention nor limit the ambit of the appended claims.

EXAMPLE 1

One-half pound quantities of sliced bologna, surface inoculated with a variety of mold spores, were wrapped in cellulose acetate film containing on the inner surface about 5 grams of sorbic acid per 1,000 square inches, the binder being shellac in the amount of 10 percent of the weight of the sorbic acid. The wrapped products were placed on a raised wire frame resting on the revolving hearth of an oven at a temperature of 450° F. After 30 seconds exposure the products were allowed to return to room temperature. Similarly inoculated control products in the same wrapper but containing no sorbic acid and binder were similarly treated. The products were then stored at 50° F. The control samples became moldy after 3 weeks, while none of the products which had been exposed to heat in the sorbic acid-treated wrapper exhibited mold spoilage after 6 weeks.

On initial examination just after the flash heating period, the only change in the bologna was slight oiling off with crystals of sorbic acid noted on the product at the air pockets. On examination after the products were stored overnight at 50° F., free oil was no longer apparent and sublimed sorbic acid crystals no longer detectable due to migration into the surface of the bologna. Less volatilization of sorbic acid was noted from the areas of the sheets in direct contact with the flat surface of the bologna. Sublimation of the sorbic acid at such areas was not required because of the intimate contact between product and wrapper.

EXAMPLE 2

One-half pound quantities of sliced ham, following surface mold inoculation, were wrapped in cellophane film containing on the inner surface about 3 grams of sorbic acid per 1,000 square inches, the binder being zein in the amount of 15 percent of the sorbic acid. Test and control products were treated as in Example 1 but the oven temperature was 550° F. and exposure time was 10 seconds. The same findings, obtained in Example 1 with respect to oiling off and sorbic acid sublimation, were again noted. Protection of the sorbic acid-treated ham against mold spoilage was such that the products could be held for a period three times longer than that of the control samples.

EXAMPLE 3

One pound slices of raw steak, surface inoculated with a variety of mold spores, were wrapped in cellophane film containing on the inner surface about 7 grams of benzoic acid per 1,000 square inches, the binder being ethyl cellulose in the amount of 8 percent of the benzoic acid. The test and control products were treated as in Example 2. No cooked discoloration of the meat surface was noted. On the meat surface at the air pockets separating it from the treated wrapper, crystals of benzoic acid were seen; these migrated with time into the surface of the meat. There was a mild odor of benzoic acid detected on removing the wrapper but this was readily and completely dissipated in cooking the meat. The raw meat samples resisted mold spoilage, for a period of 6 weeks, twice that required for the meat in the conventional non-fungistatic wrapper to exhibit mold spoilage.

EXAMPLE 4

Sliced Swiss cheese with eyes, in one-half pound units, was surface inoculated with a mixed mold spore suspension and then wrapped in cellophane film containing on the inner surface about 5 grams of sorbic acid per 1,000 square inches, the binder being microcrystalline wax in the amount of 1,200 percent by weight of the sorbic acid. The test and control (same wrapper but without sorbic acid) products were placed on a slowly moving wire belt through an insulated tunnel lined with infra-red heating elements which produced a temperature of 450° F. Approximately 20 seconds were required for the cheese samples to pass through the heated tunnel. On leaving the tunnel, the areas of wrapper not in contact with cheese were crystal clear. These became cloudy again as the wax on the wrapper reset at room temperature. Some oiliness was noted when the cheese was examined after the flash heating but not after overnight storage at 40° F. Slight difficulty was experienced in separating the cheese slices but this was not too troublesome. Sorbic acid crystals on the surface of the cheese at the air pockets (including the eyes) migrated rapidly into the cheese and were not apparent 24 hours later. Whereas the control cheese became moldy after one week at 40° F., the cheese in the sorbic acid-treated wrapper exhibited the first signs of mold growth after 5 weeks of storage at this temperature.

EXAMPLE 5

Lemons, surface inoculated with a variety of mold spores, were wrapped individually in glassine paper wrappers containing on the inner surface about 2.5 grams of sorbic acid per 1,000 squares inches, the binder being shellac in the amount of 20 percent by weight of the sorbic acid. The wrapped test and control lemons were flash heated as described in Example 4. On the surface of the lemons in the test wrapper were deposited free crystals of sorbic acid. Whereas the control lemons at room temperature became moldy in three weeks, those in the treated wrapper failed to support mold growth even after eight weeks.

EXAMPLE 6

The surface of groups of Brown 'N Serve rolls were inoculated with a variety of mold spores. Across the top of each group of rolls was placed a sheet of cellulose acetate containing on the inner surface about 5 grams of sorbic acid per 1,000 square inches, the binder being zein in the amount of 15 percent by weight of the sorbic acid. Each group of rolls in this aluminum-foil-lined cardboard shell with the cellulose acetate sheet on top was then overwrapped in regular cellophane. The packages, test and control, were flash heated as described in Example 1. Full transparency was restored to the top window, the sorbic acid from the inner sheet having volatilized to the surface of the rolls. The crystals of sublimed sorbic acid were not readily detectable because of the white background of the rolls. Test and control packages were stored at room temperature. After 5 days the control samples were moldy, whereas those receiving the benefit of the sorbic acid sublimation showed no evidence of mold propagation even after 15 days. On baking the rolls in the cardboard shell with or without the outer wrapper, all crystals of sorbic acid disappeared.

EXAMPLE 7

Loaves of nut and fruit cakes, surface inoculated on the surfaces with a variety of mold spores, were wrapped in cellophane containing about 2 grams of sorbic acid per 1,000 square inches, the binder being shellac in the amount of 6 percent by weight of the sorbic acid. The packages, test and control, were flash heated as described in Example 4. Full transparency was restored to the cellophane. The wrapped loaves in tin containers were stored at room temperature. Whereas the control cakes became moldy after 4 weeks, those in the sorbic acid-treated wrapper, exhibited the first signs of mold propagation only after 10 weeks.

EXAMPLE 8

Sorbic acid by funnel feed was fed to an infra-red heating element in a food compartment in a refrigerator. Each time the door opened, some sorbic acid contacted the heating element and was sublimed throughout the area of the food compartment. Swiss cheese, inoculated with mold spores, was stored in such a compartment. It showed no evidence of mold propagation even after 4 weeks of storage, whereas the same inoculated cheese in the same refrigerator container—but without sorbic acid sublimation—became moldy after 10 days of storage.

The terms "fungistatic" and "mold inhibiting" acid, agent or material employed herein are not used in the narrow sense of preventing mold growth but are used generically to include substances that may either retard or prevent such growth. The terms also encompass the yeast and bacterial inhibiting properties of these substances.

The term "wrapper" as applied to the packaging of food products applies to any packaging or container for food products which undergoes no deleterious chemical or physical change when heat is briefly applied for volatilization of the fungistatic acid on to the cooler surfaces of the foods contained therein.

The term "aliphatic," as applied to compounds and radicals or groups, is used in its ordinary sense as synonymous with acyclic or open chain carbon compounds and groups. The term "alkyl" radical or group is used to denote monovalent radicals derived from an aliphatic hydrocarbon by removal of one hydrogen atom.

The terms and expressions which we have employed are used as terms of description and not of limitation, and we have no intention, in the use of such terms and expressions, of excluding any equivalents of the features described or portions thereof, but recognize that various modifications are possible within the scope of the invention claimed.

What is claimed is:

1. A process of treating a package in which there is sealed and wrapped a product susceptible to microbiological growth with an air pocket existing between the wrapper and the product and in which the inner surface of the wrapper is impregnated with a fungistat of low volatility at ambient temperature comprising subjecting the package to a temperature of about 300° to 600° F., for a period not in excess of three minutes, said fungistat being highly volatile at the temperature to which it is subjected, thereby substantially volatilizing the fungistat from the wrapper, and condensing an effective amount of fungistat on the cooler surface of the product.

2. The process of claim 1 wherein the temperature is about 450° to 550° F. and the time of heating is about 5 to 30 seconds.

3. A process of treating a package in which there is sealed and wrapped a product susceptible to microbiological growth with an air pocket existing between the wrapper and the product and in which the inner surface of the wrapper is impregnated with a fungistat having the formula

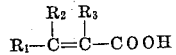

where $R_1$ is a substituent selected from the class consisting of hydrogen when $R_2$ and $R_3$ combine to form a single carbocyclic nucleus and is a carbon atom of an aliphatic hydrocarbon group when $R_2$ nd $R_3$ are hydrogen atoms comprising subjecting the package to a temperature of about 300° to 600° F., for a period not in excess of about three minutes, said fungistat being highly volatile at the temperature to which it is subjected, thereby substantially volatilizing the fungistat from the wrapper, and condensing an effective amount of fungistat on the cooler surface of the product.

4. The process of claim 3 wherein the wrapper contains about 0.5 to 15 grams of fungistat per 1000 sq. inch of wrapper surface.

5. The process of claim 3 wherein the temperature is about 450° to 550° F. and the time of heating is about 5 to 30 seconds.

6. A process of treating a package in which there is sealed and wrapped a product susceptible to microbiological growth with an air pocket existing between the wrapper and the product and in which the inner surface of the wrapper is impregnated with about 0.5 to 15 grams per 1000 sq. inch of a fungistat having the formula

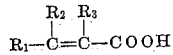

where $R_1$ is a substituent selected from the class consisting of hydrogen when $R_2$ and $R_3$ combine to form a single carbocyclic nucleus and is a carbon atom of an aliphatic hydrocarbon group when $R_2$ and $R_3$ are hydrogen atoms comprising subjecting the package to a temperature of about 450° to 550° F., for a period of about 5 to 30 seconds, said fungistat being highly volatile at the temperature to which it is subjected, thereby substantially volatilizing the fungistat from the wrapper, and condensing an effective amount of fungistat on the cooler surface of the product.

7. A process of treating a package in which there is sealed and wrapped a product susceptible to mold growth with an air pocket existing between the wrapper and the product and in which the inner surface of the wrapper is impregnated with a fungistat having the formula

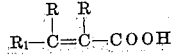

where R is a substituent selected from the class consisting of hydrogen and an alkyl group and $R_1$ is an aliphatic radical comprising subjecting the package to a temperature of about 300° to 600° F., for a period not in excess of three minutes, said fungistat being highly volatile at the temperature to which it is subjected, thereby substantially volatilizing the fungistat from the wrapper, time and temperature being correlated to provide a short period at high temperatures and vice versa to avoid significant damage to the product and decomposition of the fungistat, and condensing an effective amount of fungistat on the cooler surface of the product.

8. The process of claim 7 wherein the temperature is about 450° to 550° F. and the time is about 5 to 30 seconds.

9. A process of treating a package in which there is sealed and wrapped a product susceptible to mold growth with an air pocket existing between the wrapper and the product and in which the inner surface of the wrapper is impregnated with about 0.5 to 15 grams per 1000 sq. inches of a fungistat having the formula

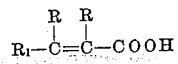

wherein R is a substituent selected from the class consisting of hydrogen and an alkyl group and $R_1$ is an aliphatic radical comprising subjecting the package to a temperature of about 450° to 550° F., for a period of about 5 to 30 seconds, said fungistat being highly volatile at the temperature to which it is subjected, thereby substantially volatilizing the fungistat from the wrapper, time and temperature being correlated to provide a short period at high temperature and vice versa to avoid significant damage to the product and decomposition of the fungistat, and condensing an effective amount of fungistat on the cooler surface of the product.

10. The process of claim 9 wherein the fungistat is sorbic acid.

11. A process of treating a package in which there is sealed and wrapped a product susceptible to microbiological growth in which the inner surface of the wrapper is impregnated with a fungistat of low volatility at ambient temperature comprising subjecting the package to a temperature of about 300° to 600° F., for a period not in excess of three minutes, said fungistat being highly volatile at the temperature to which it is subjected, thereby substantially volatilizing the fungistat from the wrapper, and condensing an effective amount of fungistat on the cooler surface of the product.

12. The process of claim 9 wherein the product is a cheese.

13. The process of claim 9 wherein the product is a fruit.

14. The process of claim 9 wherein the product is a vegetable.

15. The process of claim 9 wherein the product is a meat product.

16. The process of claim 9 wherein the product is a baked product.

References Cited in the file of this patent

UNITED STATES PATENTS

| | | |
|---|---|---|
| 2,379,294 | Gooding | June 26, 1945 |
| 2,480,010 | Flett | Aug. 23, 1949 |
| 2,724,650 | Melnick | Nov. 22, 1955 |

FOREIGN PATENTS

| | | |
|---|---|---|
| 391,666 | Canada | Oct. 1, 1940 |

OTHER REFERENCES

"Paper Trade Journal," July 17, 1953, page 34, article entitled "New Cheese Wrap Reduces Mold."

"Food Technology," March 1954, pp. 133 to 135, inclusive.